United States Patent
Manico et al.

(10) Patent No.: US 8,244,840 B2
(45) Date of Patent: *Aug. 14, 2012

(54) SIMPLIFIED WALK-UP ENABLEMENT OF INTER-BASED, PERSONALIZED ACCESS TO RETAIL IMAGING DEVICES AND SERVICES

(75) Inventors: Joseph A. Manico, Rochester, NY (US); Angelo Caruso, Marion, NY (US); James F. Herrmann, Fairport, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/306,271

(22) Filed: Nov. 29, 2011

(65) Prior Publication Data

US 2012/0075655 A1    Mar. 29, 2012

Related U.S. Application Data

(63) Continuation of application No. 12/100,541, filed on Apr. 10, 2008, now Pat. No. 8,095,631.

(51) Int. Cl.
*G06F 15/177* (2006.01)
(52) U.S. Cl. .................... 709/222; 709/220; 709/221
(58) Field of Classification Search ........... 709/220–222
See application file for complete search history.

(56) References Cited

U.S. PATENT DOCUMENTS

| | | |
|---|---|---|
| 5,157,717 A | 10/1992 | Hitchcock |
| 6,301,012 B1 | 10/2001 | White et al. |
| 6,823,526 B2 | 11/2004 | Howard et al. |
| 6,989,910 B2 | 1/2006 | Lomas et al. |
| 7,136,174 B2 | 11/2006 | Chapin et al. |
| 7,213,766 B2 | 5/2007 | Ryan et al. |
| 7,316,022 B2 | 1/2008 | Nishio |
| 2002/0174206 A1 | 11/2002 | Moyer et al. |
| 2002/0199208 A1 | 12/2002 | Chang et al. |
| 2005/0144641 A1 | 6/2005 | Lewis |
| 2005/0149204 A1 | 7/2005 | Manchester et al. |
| 2005/0190399 A1 | 9/2005 | Nakaoka et al. |
| 2005/0270571 A1 | 12/2005 | Fujitani et al. |
| 2006/0082817 A1 | 4/2006 | Crosier et al. |
| 2006/0173718 A1 | 8/2006 | Murphy |
| 2006/0190413 A1 | 8/2006 | Harper |
| 2007/0033637 A1 | 2/2007 | Yami et al. |
| 2007/0285523 A1 | 12/2007 | Ward et al. |
| 2007/0291323 A1 | 12/2007 | Roncal |
| 2008/0082813 A1 | 4/2008 | Chow et al. |
| 2008/0103975 A1 | 5/2008 | Taratino et al. |
| 2008/0220707 A1 | 9/2008 | Jones et al. |
| 2008/0225338 A1 | 9/2008 | Mullender et al. |
| 2008/0281878 A1 | 11/2008 | Scott et al. |
| 2009/0106116 A1 | 4/2009 | Zingsheim |

*Primary Examiner* — Hieu Hoang
(74) *Attorney, Agent, or Firm* — Ronald R. Schindler, II

(57) ABSTRACT

An apparatus and method for loading and configuring an imaging device driver to facilitate turnkey remote access via the interne to the complete and explicit feature set and capabilities provided by a specific, user selected, retail imaging kiosk or digital photofinishing system.

3 Claims, 5 Drawing Sheets

SIMPLIFIED WALK-UP ENABLEMENT OF INTER-BASED, PERSONALIZED ACCESS TO RETAIL IMAGING DEVICES AND SERVICES

CROSS REFERENCE TO RELATED APPLICATIONS

This application is a continuation of prior U.S. patent application Ser. No. 12/100,541, filed Apr. 10, 2008 now U.S. Pat. No. 8,095,631 which is hereby incorporated by reference in its entirety.

This application relates to commonly assigned application U.S. Ser. No. 12/100,558, filed Apr. 10, 2008, entitled "SIMPLIFIED WALK-UP PRINT DRIVER INSTALLATION", and which is herby incorporated by reference.

FIELD OF THE INVENTION

The invention relates to networked digital image compositing and hardcopy output systems and more specifically to a system and methodology for writing and deploying mobile temporary memory to enable personalized and secure access via the internet to one or more retail imaging applications servers.

BACKGROUND OF THE INVENTION

Recent studies of consumer digital and online imaging preferences have indicated a strong (over 30%) desire for on-line (e.g., at home via the internet) editing, creation, and ordering of custom made image based products and retail store pick up of the resulting image based products. With the advent of retail store based networked imaging kiosks and systems the production of many of these types of custom imaging products can be performed at the retail location. The user currently can bring a memory device containing their personal images to the retail store or order prints online which are then printed at the store but these methods can prove cumbersome, requiring multiple trips to the retail location, waiting in lines, and a loss of privacy (when working on personal images in a public location).

Most retail imaging devices have access to professionally produced creative content, such as holiday and seasonal graphics, templates, decorative borders and the like, which is routinely refreshed to reflect the current holiday season, special events, and/or licensed content such as characters from a popular movie. In addition, with modular retail imaging devices, software and hardware components are upgraded periodically and typically include new capabilities, features, and output options such as enhanced red-eye removal, the addition of DVD writing capability, poster printing via a large format inkjet printer, etc. With on-line print ordering the user can edit and manipulate individual images using PC-based software such as EasyShare, save the file on their hard drive, then upload the image to an online photofinishing service provider, and then select a retail destination for the file to be printed. The user must learn and negotiate several of the software packages, provide for payment over the Internet, and the user's options are limited to the capabilities provided via the on-line service provider. In addition the image product options provided by the retail image device may not be available via the on-line "print at store" systems currently available. Whereas producing simple "snapshot" prints from personal image files is in decline, the market for more advanced imaging products is growing.

Prior art systems and methods allow the user to designate a retail site that will print their image files and forward the images files either directly or through an online photofinishing service provider. These systems do not provide the user with access to the full range of features and capabilities provided by the retail imaging device. Also, prior art systems allow users to access their online image collections if the online image repository has made previous arrangements with the retailer. In these systems the user is never directly accessing the retail imaging device or its inherent capabilities and features. With systems that allow the user to download images from an online image repository the user has to perform editing and selection functions in the retail establishment (directly at the walk-up kiosk) and must transfer their images files in advance to an online image repository affiliated with the retailer. This system requires the user spend time in the store waiting for an available imaging device and then locate, access, and download the desired image files from a designated online image repository before the process of making a customized image product can even begin.

Prior art techniques as disclosed in U.S. Pat. No. 7,275,044 B2 SYSTEM, METHOD AND SOFTWARE PRODUCT FOR ORDERING IMAGE PRODUCTS OVER A COMMUNICATION NETWORK FROM A PLURALITY OF DIFFERENT PROVIDERS HAVING VARIOUS BUSINESS RELATIONSHIPS, attempt to overcome the limitations described above but require complex pre-arranged business and technical collaborations in order for a user to access printing capabilities at a retail store and present the user with a complex array of service options and locations. This system also does not provide direct access to the features and capabilities of individual retail image devices and systems that the user may already be familiar with.

A client/server based architecture model, allowing devices to share files and resources, is one of the most prevalent and common approaches to network computing today. Many mature client-server technologies are defined in the prior art and are noteworthy due to their ability to ensure security, 'friendliness' of the user interface, and ease of use. Each instance of a client is able to send data requests to one or more connected servers. The server(s) accept, process, and return the processed data or other relevant information to the client. A client is often deployed as a web-browser application, and might interact with a server using the extensible markup language (XML) over the network via the hypertext transfer protocol (HTTP). Typically, client-server architecture enables the roles and responsibilities of a computing system to be distributed among several independent computers that are known to each other only through a network. It is possible to replace, repair, upgrade, or even relocate a server while its clients remain unaware and unaffected by such a change. All the data is stored on the servers, which generally have far greater security controls than most clients. Servers can better control access and resources, to guarantee that only those clients with the appropriate permissions may access and change data. Since data storage is centralized, updates to those data are easy to administer.

SUMMARY OF THE INVENTION

The invention comprises a system and methodology based upon specialized imaging kiosk application server software for writing a personal temporary memory device (e.g., USB flash drive) with unique content that, when said temporary memory is then accessed by typical user devices with interne access, e.g., home computer, laptop, PDA, mobile phone, etc., enables the recipient's user device with a fully customized, self-contained, and secure access to the complete feature set and capabilities of one or more retail imaging kiosks.

It is an objective of this invention to facilitate turnkey remote access via the internet to the complete and explicit feature set and capabilities provided by a specific, user selected, retail imaging kiosk or digital photofinishing system.

Another objective is to seamlessly adapt the delivery of the remote access application support based on the retailer's network infrastructure and wishes. Specifically, the remote access will be served up by the retail site imaging kiosk equipment itself, or optionally, through a centralized KODAK application server facility. The system enables the retailer to predefine the location of the remote application server based on their unique requirements.

A third objective of this invention is to provide a system and methodology for providing a turnkey remote access user experience that largely mimics the graphical user interface (GUI) provided for users who operate the kiosk "hands-on", directly within the retail store. This common GUI "look and feel" approach provides all users (from novice to expert) with a familiar and intuitive environment in which they can create a wide array of imaging output.

Another objective is to preserve and protect the retailer's one-to-one relationship with their kiosk-centric customers by facilitating remote access based hardcopy output to only those imaging devices specified in advance by the retailer.

DETAILED DESCRIPTION OF THE INVENTION

Figure 1:
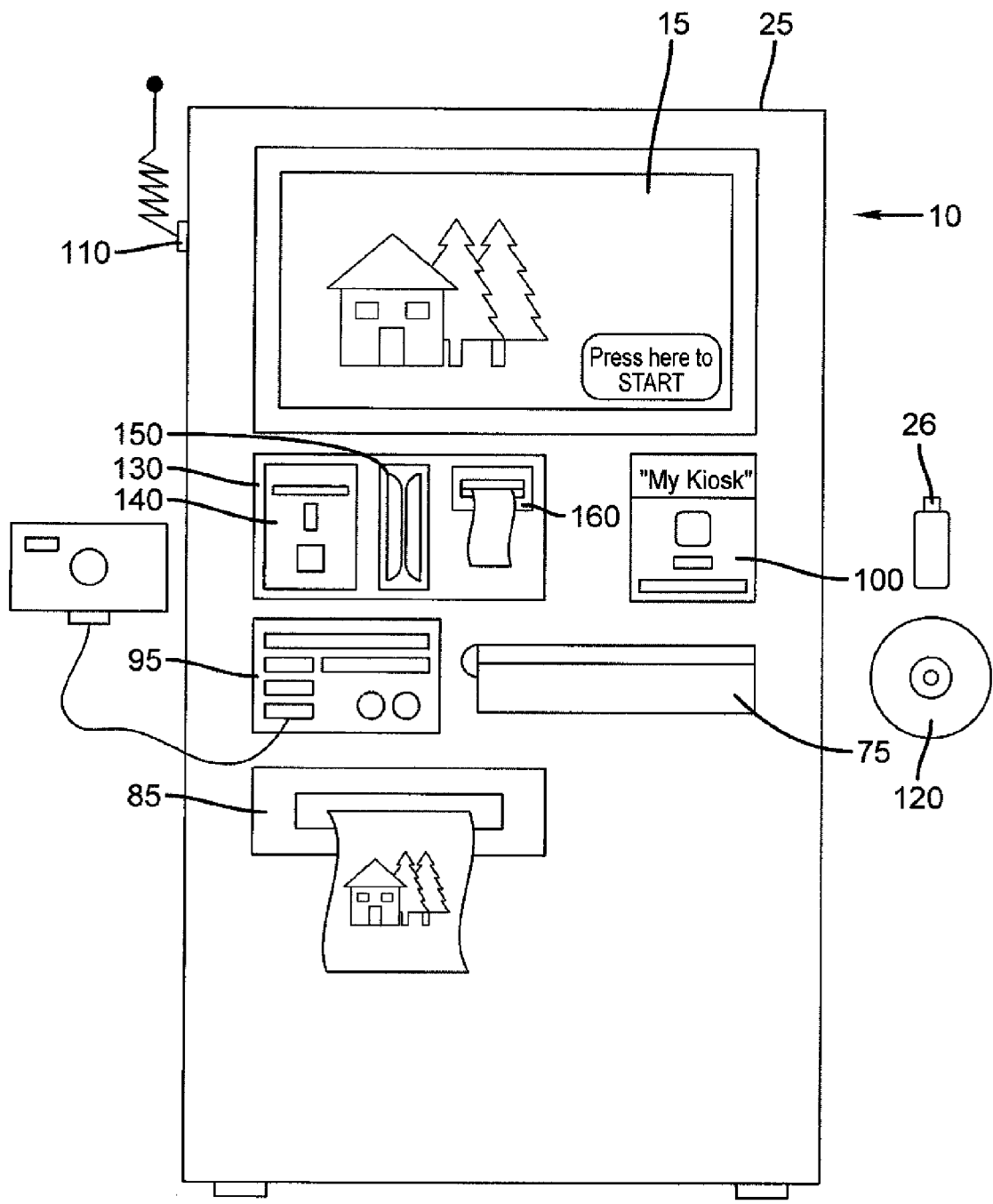
FIG. 1 illustrates a networked kiosk including a simplified walk-up remote access enablement system and payment mechanisms according to this invention.

FIG. 1 shows a networked imaging device 10, such as any retail imaging device including a retail device referred to hereafter as a kiosk. The imaging device includes a main chassis 25, and an opening/aperture 95 adapted to receive a memory device 18 such as a memory card, memory stick, SD card, floppy, CD, or the like. The networked kiosk includes simplified walk-up remote access enablement system and payment mechanisms. A touch screen 15 is provided to select, view, edit, annotate, print, record, and/or transfer images. Payment and user identification devices 130, can include a currency transaction mechanism 140, a card reader 150, and a receipt printer 160 as well as other devices and systems. These devices can be used collaboratively depending on user preferences. For example, to establish a pre-paid account, the currency transaction mechanism 140 can be used in conjunction with the card reader 150, thereby enabling a user to provide both cash equivalent and an identification card to the kiosk 10.

The card reader 150 can obtain identification information from a user via personal identification sources such as a driver's license or credit card which can be stored in the kiosk memory or remotely on the retail store's accounting system (not shown). A receipt printer 160 can be used to provide the user with tangible proof of his pre-paid account and an also be used to provide the user with passwords, coupons, special offers, or other information specific to the individual user's account.

Input/output data devices 95 on the kiosk 10 provide opening/apertures adapted to receive the memory device 18 including but not limited to a memory card, memory stick, SD card, floppy, CD/DVD, tethered camera, wireless Infrared transmission systems, wireless radio frequency systems, and wireless near field communication systems. Having the option to use this array of memory device modalities allows the user has the option to use the memory device of her choice in order for images and other forms of information to be transferred to and from the kiosk.

The user can use a computer-readable medium such as personal temporary memory 26 responsive to a computer readable medium such as kiosk memory through a connection (wired or wireless) 30 or via a DVD writer 31. A button 102 on panel 100 is used to initiate the transfer of information to memory device 26 or DVD 120. Button 102 can also be responsive to the receipt of payment on identification information previously provided by the user via payment and user identification devices 130 by, for instance, becoming illuminated indicting to the user that the kiosk is prepared to transfer access information.

Also included on the kiosk 10 is a network connection 110 with can be wired or wireless, photo printer 85 which can include any suitable thermal dye sublimation, ink jet, digital AgX, or electrophotographic type printer, and scanner 75 which can scan hardcopy media such as photographs, documents, and/or transparencies.

The system and method are designed to appear straightforward to the user and require no prior knowledge of software installation procedures, thereby enabling even the most novice user to quickly gain Internet-based access to all of the imaging and hardcopy output capabilities of the retail kiosk. The imaging kiosk remote access enablement software is designed to support the well-established client-server architecture paradigm, ensuring that all imaging application information resides on the server. Thus, the customer's interne access device will behave as a "thin-client"—thereby eliminating the need to locate and install specialized software directly onto the user's device. Further, the thin-client approach ensures that the user is always presented with, and has access to, precisely those capabilities and features that are supported directly by the retail site's imaging kiosk application server. Whenever the imaging kiosk's capabilities are enhanced or modified in any way, i.e., through the addition of new hardcopy devices, new creative content, new image enhancement features, or the like, the thin-client will have immediate and direct access to those new capabilities.

A user interacts with a specific networked imaging device (kiosk) or imaging system (Apex dry lab "KODAK Adaptive Picture Exchange") at a retail location using the same walk up personal temporary memory device modality as defined within commonly assigned application U.S. Ser. No. 12/100, 558, entitled "SIMPLIFIED WALK-UP PRINT DRIVER INSTALLATION", and which is assigned to the assignee of this application and incorporated by reference. The user transfers the remote access enablement information from the kiosk/imaging system application server to their personal computer (or other user device). Once enabled, the user is able, from any remote or local site with internet access, to leverage the features and capabilities of the imaging system including the submission of hardcopy print requests. Sales order instructions can also be conveyed from the user device such as specifying home delivery or in-store pick up. This additional information resides within the imaging system's application server software and can be readily communicated to the retail establishment via a hardcopy (receipt print), softcopy (clerk instructions on imaging device or system), or imprinted on the print itself (non imaging surface, IR ink, barcode, etc.).

Figure 2:
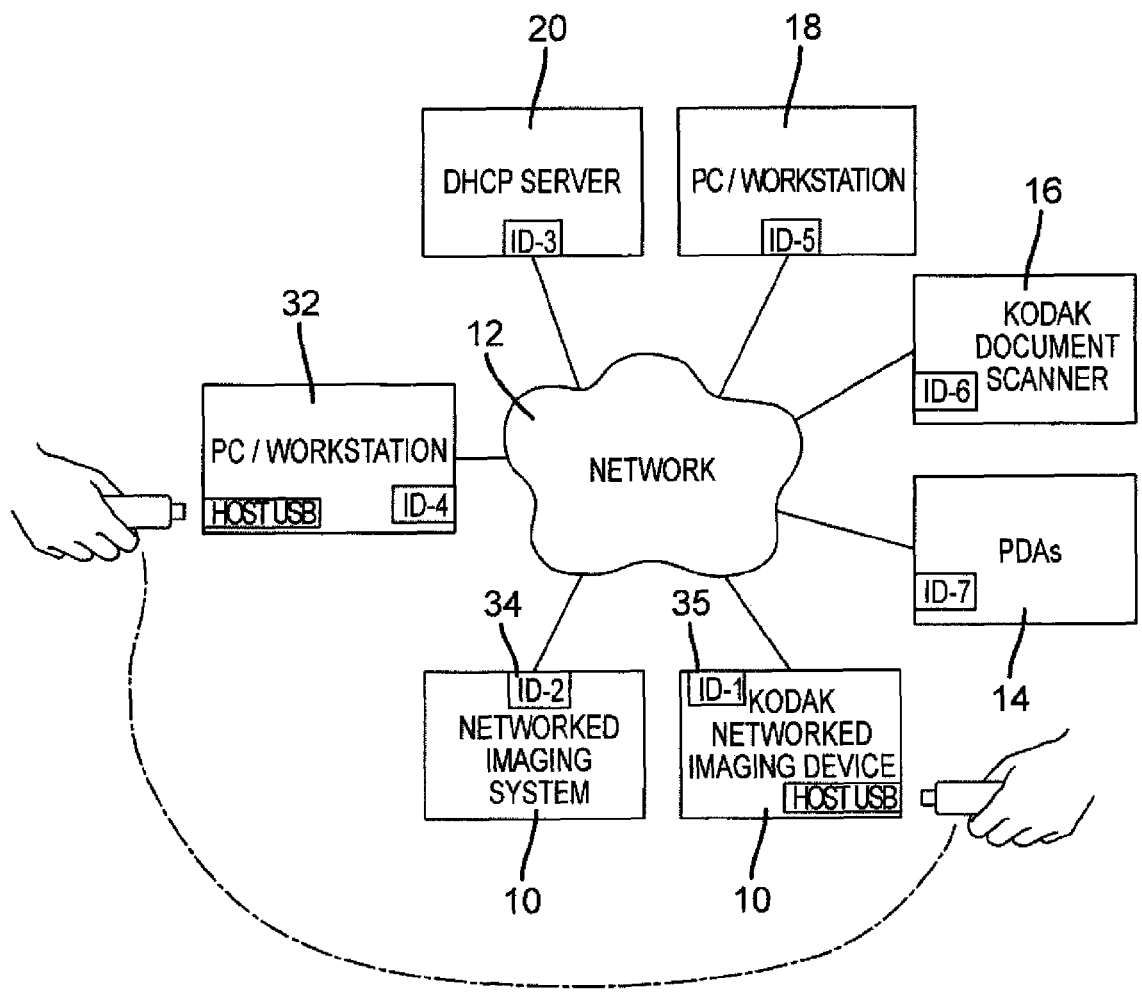
FIG. 2 is a schematic view of a network-printing environment including a simplified remote access enablement system according to this invention.

FIG. 2 depicts a fully automated remote access enablement process to allow a user to take advantage of their walk-up visit to one or more imaging/hardcopy output devices, shown here as one or more retail imaging kiosks 10, that the user would like to use for various image compositing and/or hardcopy printing operations from a user device. The network-printing environment includes a simplified remote access enablement system for the user of a kiosk. User devices can include one or more devices that could be in communication with a network 12 such as a personal digital assistant (PDA) 14, a document scanner 16, a workstation including a personal computer (PC) and/or a server 20.

The user first determines what retail kiosk(s), which are spatially independent from their user device 11 that they want to access. After the user selects the specific kiosk, they simply walk up to it and connect a personal temporary memory device to the kiosk. Then, via a simple user interface selection, they are able to initiate the creation of a user account and password on the application server along with the writing of a unique set of kiosk remote access enablement instructions and information for the selected, uniquely identified, kiosk 10, to their personal temporary memory device. The instructions include simple yet complete information to enable any user device with appropriate internet access to act as a thin-client and access the full capabilities of the selected kiosk 10. The instructions and information includes:

- a Uniform Resource Identifier (URI) for the networked kiosk application server. The URI may point to and reference the networked kiosk system located directly at the retail site, or at the discretion of the kiosk system administrator, the supplied URI can point to one or more external application servers. In either case, the URI enables the user device to precisely locate and communicate with the kiosk application server from a remote location via the internet;
- the configuration information record (CIR) for the retail imaging system that the user is operating and made a connection to with their personal temporary memory device. The CIR is a simple, private data structure defined by KODAK, and will include at a minimum the retail imaging system's serial number, software revision level(s), and a detailed accounting of the hardware and software feature sets;
- user account name information (encrypted); and
- other as needed information that would facilitate and streamline any retail sale interactions, for example, a verification of transaction information such as User ID and payment devices has been received could also be stored as a part of the information that is written to the personal temporary memory device.

Figure 3:
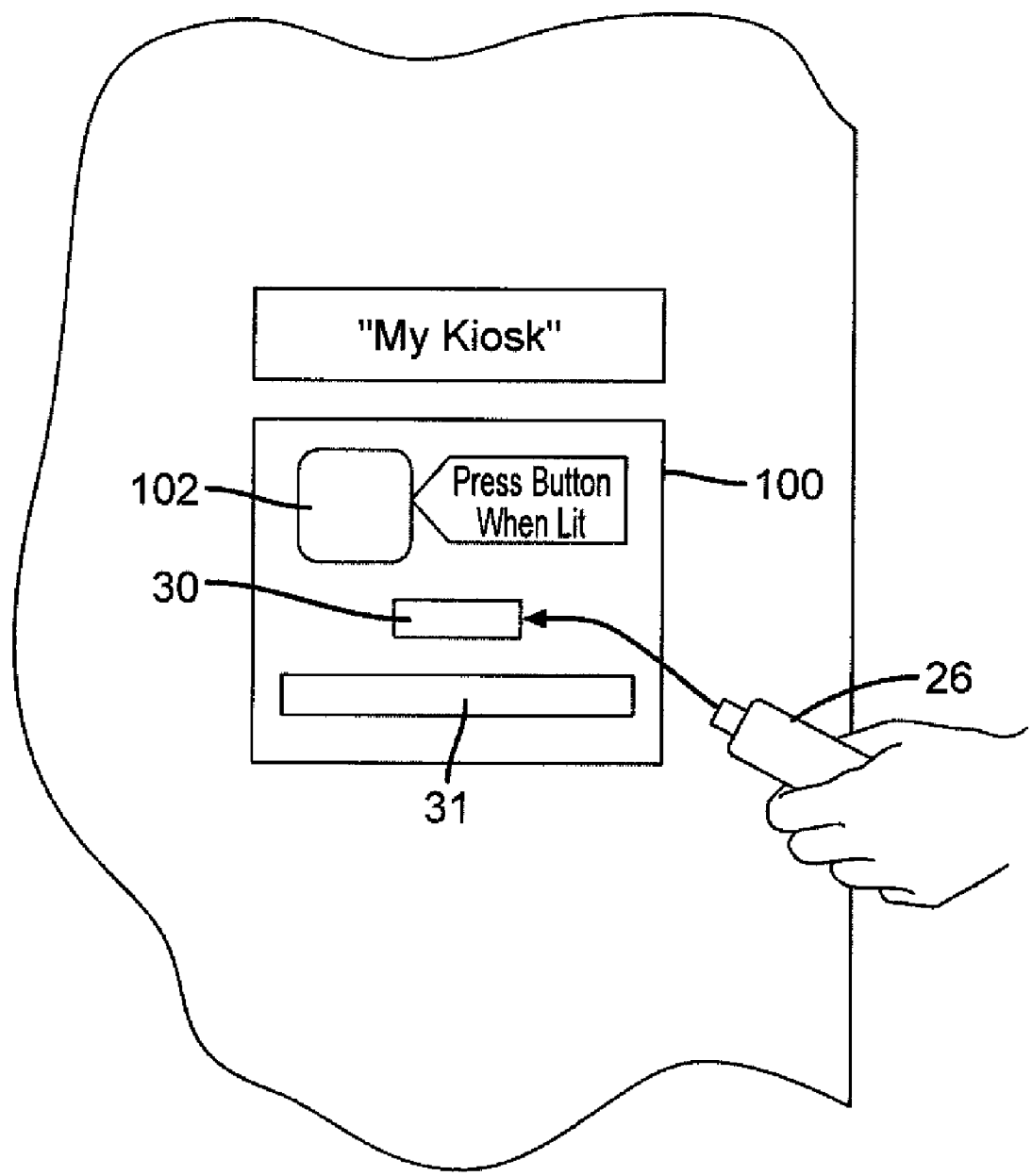
FIG. 3 is a schematic view of a network kiosk supporting the walk-up remote access enablement feature and capability and highlights the locations of the key user interface items including the operator's control panel and USB Host ports.

As shown in FIG. 3, the user can use their personal temporary memory 26 responsive to the kiosk memory through a wired or wireless (including but not limited to near field communication (NFC)) connection 30 at the user-selected kiosk 10 to receive and transport the replicable kiosk remote access enablement instructions and information 22. The network kiosk shown supports the walk-up remote access enablement feature and capability and highlights the locations of the key user interface items including the operator's control panel and USB Host ports. The personal temporary memory 26 types of memory include devices such as an USB flash drive, DVD disks, cell phone etc. The explicit steps defining the UI interaction(s) required to ensure that an appropriate personal temporary memory device has been properly connected and has sufficient available free space will not be elaborated upon here as it is known to and trivial for those skilled in the art.

Figure 4:
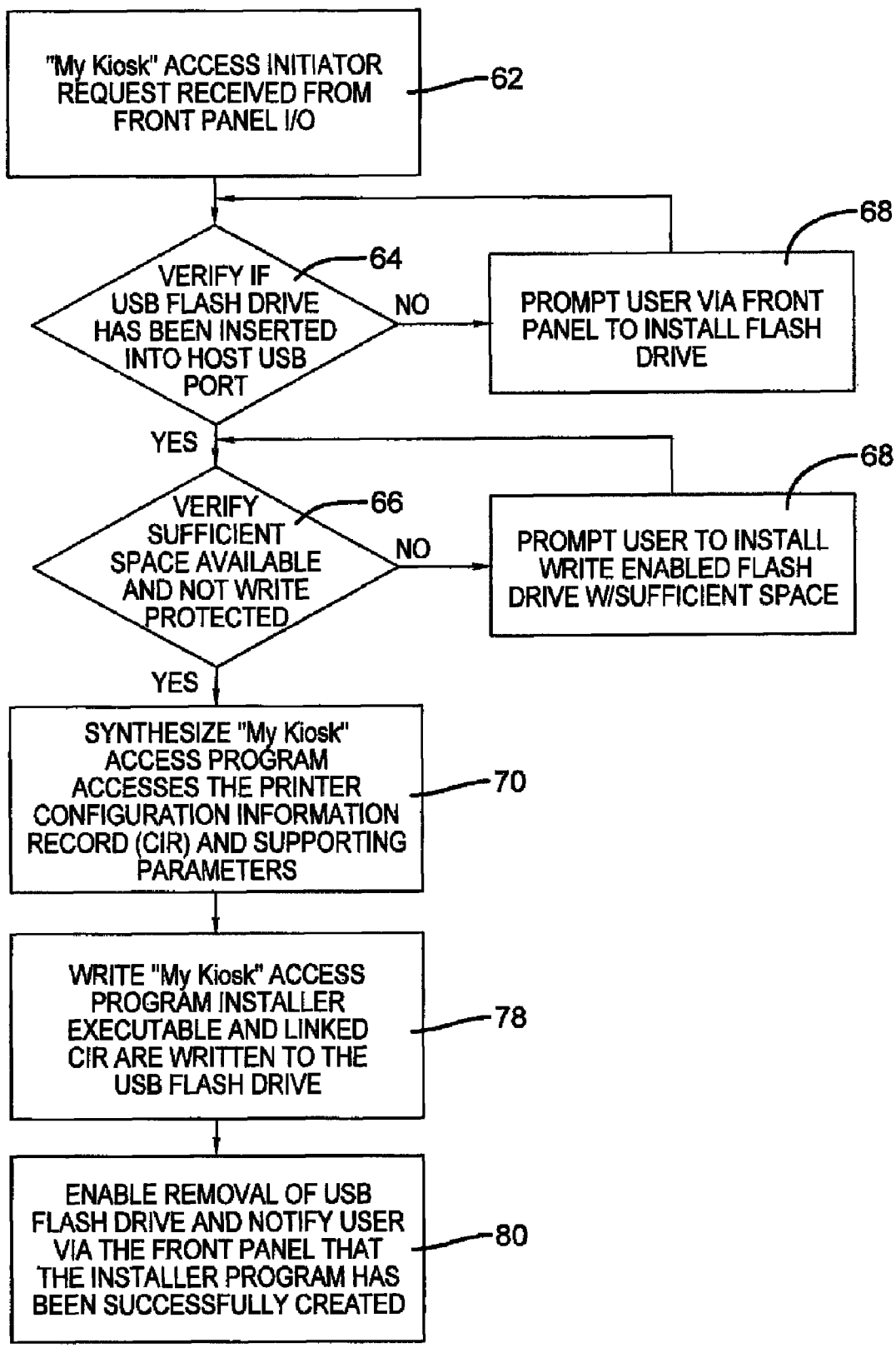
FIG. 4 illustrates one embodiment of the process of utilizing the simplified remote access enablement features including inserting the USB flash drive into one of the kiosk's host USB ports located on the front of the kiosk.

The associated method 60 to enable the remote access capabilities is illustrated by the schematic shown in FIG. 4. This is one embodiment of the process of utilizing the simplified remote access enablement feature including inserting the USB flash drives into one of the kiosk's host USB ports located on the front of the kiosk. First the "My Kiosk" access initiator request is received from the front panel I/O 62 and verified to confirm that the USB flash drive has been inserted into the host USB port 64. If it has been inserted then the system verifies that sufficient space is available (and not write protected) 66 but if not inserted then the system prompts the user via a front panel to install a flash drive 68. If there is not enough space available to continue then the system prompts 68 the user via a front panel to install write enabled flash drive with sufficient space or use another available method of memory storage, such as a remote or wireless method, if available or to use the retail storage system. Next the system synthesizes 70 the "My Kiosk" access program and accesses the printer configuration information record (CIR) and supporting parameters as further described in the co-pending application commonly assigned application U.S. Ser. No. 12/100,558, entitled "SIMPLIFIED WALK-UP PRINT DRIVER INSTALLATION". Next the access program installer instructions and the linked CIR are written to the USB flash drive 78. When all is complete the USB flash drive removal is enabled and the user notified, via a front panel or other method, that the installer program has been successfully completed 80 and the user can remove the drive.

The illustrated method is designed to be simple for a user to initiate and should be comfortable for all types of users since it is location enhanced. The method uses a physical, hands-on approach to selecting the target retail imaging kiosk and gathering up in a turnkey manner the required remote access information for that particular kiosk. Such an approach is far more intuitive for novice and expert alike, as opposed to the prior art which often relied on a more ambiguous, logical association that would be made remotely somewhere within the network cloud.

The remote access software provides the imaging kiosk system administrator with the ability to explicitly define the remote application server location, i.e., its URI. Providing this flexibility recognizes that some retailers may not wish to provide direct internet access to their retail imaging equipment but would rather have the application functionality served up externally. KODAK, or other suitable business entity, can provide centralized imaging kiosk application server infrastructure for such cases. Given that the information written to the temporary memory includes the imaging kiosk's CIR, then this CIR information is available, through the thin-client, to the centralized application server. The application server will use this information to precisely configure the application features and capabilities to exactly match those available at the retail imaging kiosk identified in the CIR. In this manner, the remote access feature set is guaranteed to precisely match the local feature set. Other retailers will quite readily provide direct internet access to their private LAN and equipment. In those cases, the URI will point directly to their retail equipment.

The remote access software is designed to not only deliver the same features and capabilities, but also to the extent possible deliver those capabilities to the remote user in a manner that largely mimics the same GUI look and feel that a user would experience operating the kiosk hands-on, directly at the retail site. A common user experience, whether local or remote, provides all users (from novice to expert) with a familiar and intuitive environment in which they can create a wide array of imaging output.

The remote access enablement does not allow the user to save their image editing work in such a way that they can print to their home printer or any other hardcopy device other than the retail kiosk-based hardcopy unit(s). The user is allowed to submit hardcopy output and purchase their prints solely from the location at which they gained remote access support. This limitation ensures that the retailer who has provided the system infrastructure for remote access support is able to capture the business and revenue from a customer who might prefer to work at home, instead of at a busy kiosk in the store, to perform their edits and layouts. This is especially important in labor intensive image compositing applications such as creative scrap books, albums and calendar products. Remote access to the full kiosk feature set enables the user to spend as much time performing image composition and manipulation as they feel is necessary to achieve a high quality end-product. The prior art supported only local, hands-on editing at the retail kiosk—forcing other customers to queue up and wait their turn. During peak usage periods, it would not be unusual for queue times to become excessive, causing some customers to leave the retail site without having completed a purchase, resulting in unhappy customers and lost retail revenue.

Figure 5:
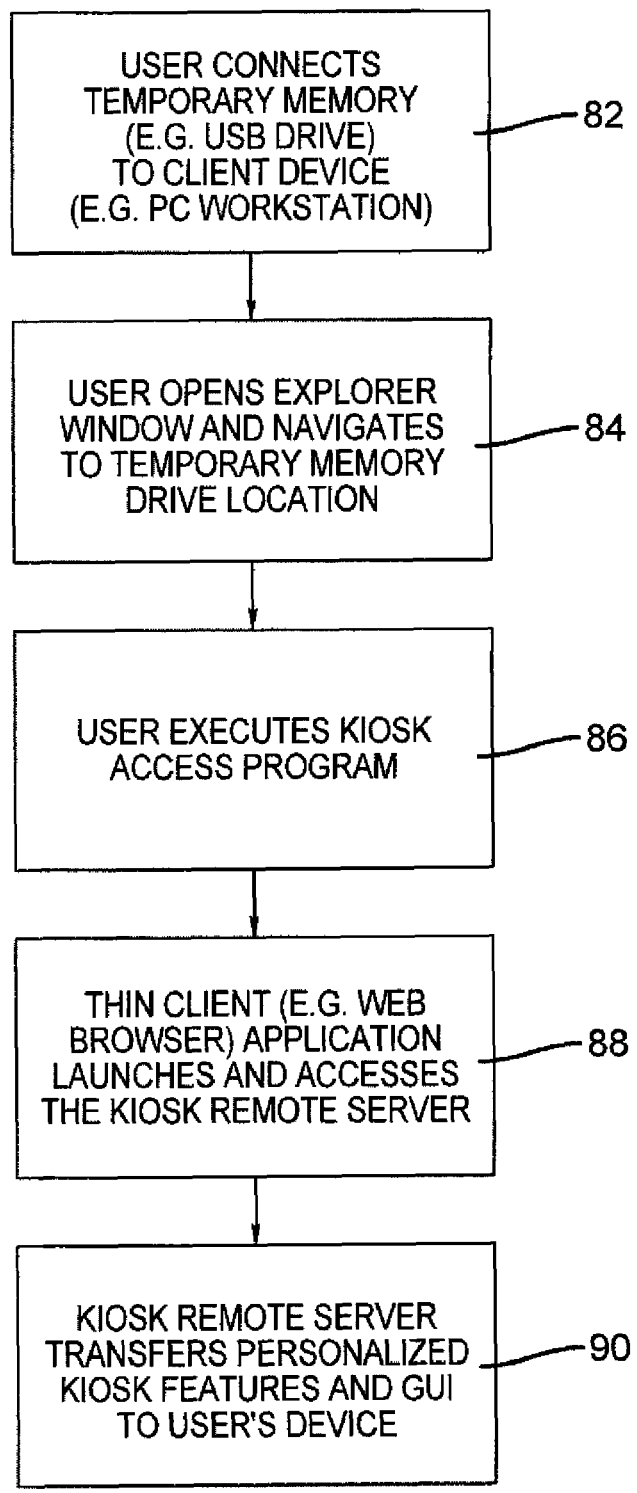
FIG. 5 illustrates a portion of the embodiment shown in FIG. 4 at a high level including the location of the retail kiosk application server software and remote access enablement features within the overall kiosk electronics architecture.

FIG. 5 illustrates a portion of the embodiment shown in FIG. 4 at a high level including the location of the retail kiosk application server software and remote access enablement features within the overall kiosk electronics architecture. In this embodiment, the user transports 82 their personal temporary memory device, e.g., a USB flash drive, to their PC/workstation and plugs the flash drive into their PC's USB host port. The user then opens Explorer windows 84 and navigates to the USB flash drive directory. The user executes the kiosk access program 86, such as by simply clicking on the URI hypertext link for the retail kiosk. This direct link will be located in the root directory of the flash drive. This will establish the PC/workstation as a thin-client 88 that acts as the user interface for the kiosk's remote application so that a Kiosk remote server can transfer personalized Kiosk features and GUI to the user's device 90 making this system very easily personalized.

Another embodiment has the customer prepaying (or pre-authorizing) with a credit card at the time they connect their personal temporary memory device to the kiosk. That way when they go home and start working on their images they don't need to fill out an application form or upload their images to a server or anything like that. They just get right to the business of editing and laying out their pictures for printing, with no ancillary requirements or activities.

The invention has been described in detail with particular reference to certain preferred embodiments thereof, but it will be understood that variations and modifications can be effected within the spirit and scope of the invention.

What is claimed is:

1. A method for operating a central application server, the method comprising:

receiving a first connection request from a retail imaging device to the central application server over a network and in response, creating remote access instructions for remotely accessing the retail imaging device, the remote access instructions including a unique Uniform Resource Identifier (URI) for the central application server and configuration information record for the retail imaging device including an identification and software and hardware feature sets of the retail imaging device;

sending the remote access instructions to the retail imaging device so that the retail imaging device stores the remote access instructions in a portable storage device for use by a remote user device;

receiving a second connection request from the remote user device to the central application server using the unique URI stored in the portable storage device and providing the configuration information record to the central application server; and configuring, based on the configuration information record, a software application for remotely accessing the retail imaging device and sending the software application to the remote user device, wherein the software application being executed by the remote user device to provide local feature sets at the remote user device that match the software and hardware feature sets available at the retail imaging device according to the configuration information record, with the local feature sets including a local graphic user interface that matches the graphic user interface provided to the user at the retail imaging device.

2. The method of claim 1, wherein the user device is a cell phone and the portable storage device is a memory in the cellular phone.

3. The method of claim 1, wherein the user device is a personal digital assistant and the portable storage device is a memory in the personal digital assistant.

* * * * *